F. E. LASURE.
FRICTION CLUTCH.
APPLICATION FILED OCT. 10, 1913.

1,149,924.

Patented Aug. 10, 1915.
2 SHEETS—SHEET 1.

Witnesses:
Pearl Stanton
C. Lindner

Inventor,
F. E. Lasure, by
G. C. Kennedy,
Attorney.

F. E. LASURE.
FRICTION CLUTCH.
APPLICATION FILED OCT. 10, 1913.

1,149,924.

Patented Aug. 10, 1915.
2 SHEETS—SHEET 2.

Witnesses:

Inventor,
F. E. Lasure, by
G. C. Kennedy,
Attorney.

UNITED STATES PATENT OFFICE.

FLOYD E. LASURE, OF WATERLOO, IOWA, ASSIGNOR TO LASURE MANUFACTURING COMPANY, OF WATERLOO, IOWA.

FRICTION-CLUTCH.

1,149,924.  Specification of Letters Patent.  Patented Aug. 10, 1915.

Application filed October 10, 1913. Serial No. 794,434.

*To all whom it may concern:*

Be it known that I, FLOYD E. LASURE, a citizen of the United States of America, and a resident of Waterloo, Blackhawk county, Iowa, have invented certain new and useful Improvements in Friction-Clutches, of which the following is a specification.

Figure 1:
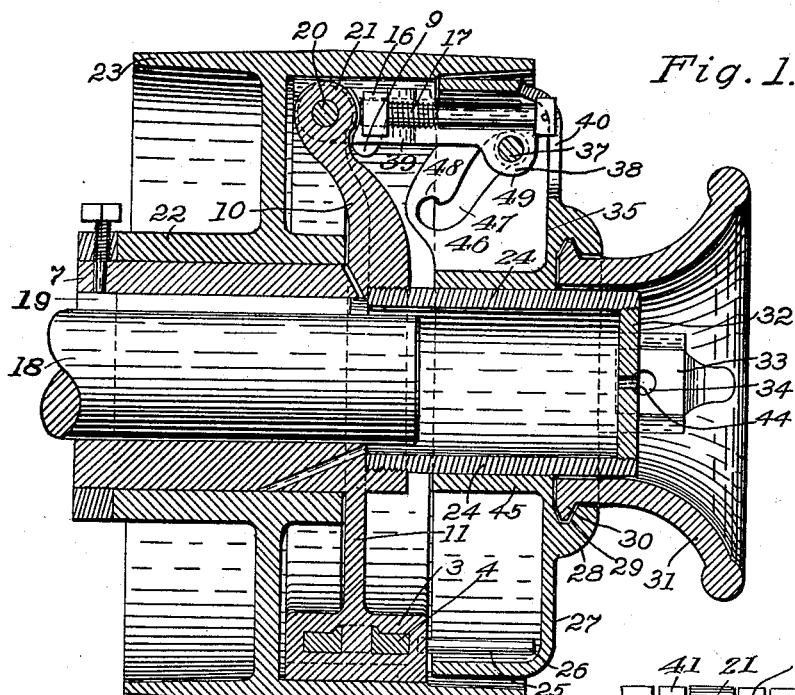
Figure 2:
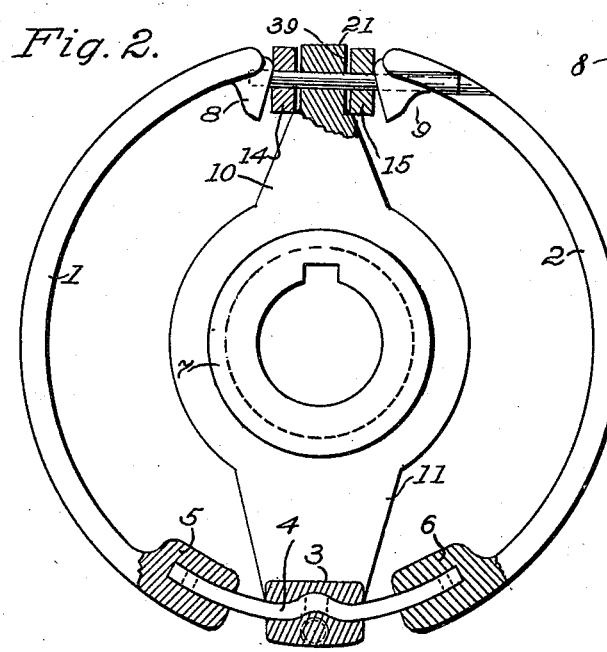
Figures 3, 4:
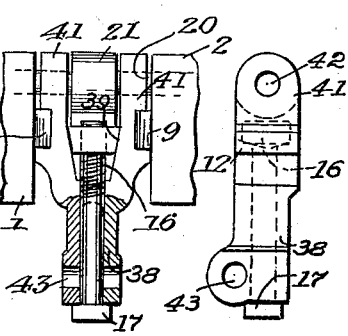
Figures 5, 6:
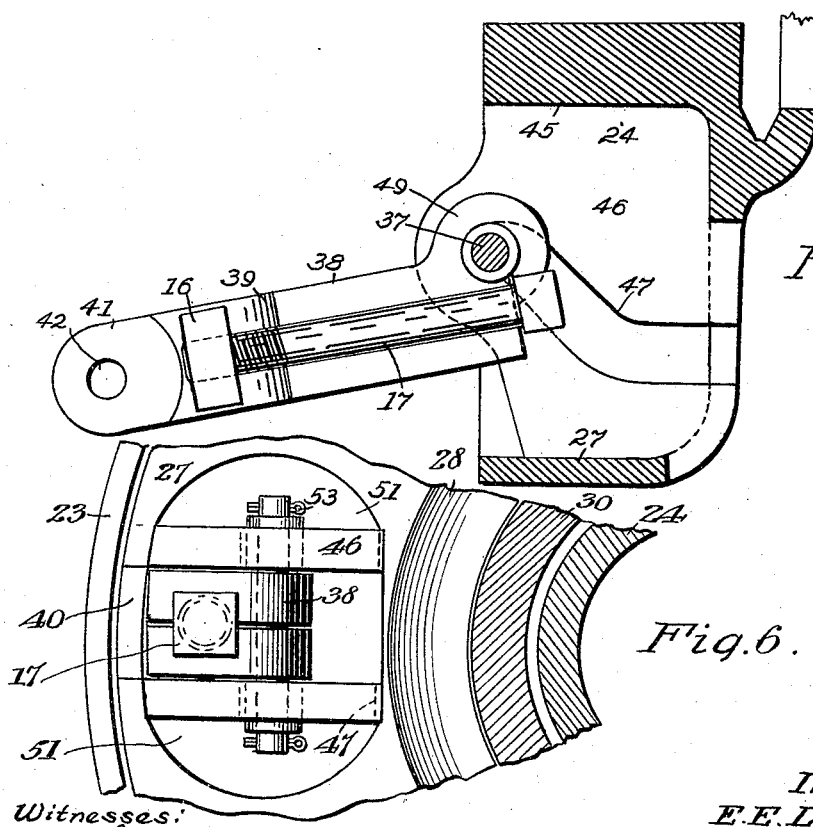

My invention relates to improvements in friction clutches, and the object of my improvement is to provide an improved friction clutch furnished with means whereby it may be engaged or disengaged between a driving pulley and a driven shaft manually, and having means for taking up wear as well as improvements in detail. This object I have accomplished by the means which are hereinafter described and claimed, and which are illustrated in the accompanying drawings, in which:

Figure 1 is a vertical axial longitudinal section through a driving pulley, and my improved friction clutch. Fig. 2 is a front elevation of the semi-cylindrical friction-heads with their resilient connections to a supporting-body, and showing on the other side of said supporting-body the coöperating means placed between the free ends of said friction-heads adapted to be actuated to spread said heads apart. Fig. 3 is a detail view of the spreader-bodies in coöperation with opposed parts of the friction-heads. Fig. 4 is a side elevation of the said spreader-bodies. Figs. 5 and 6 are details of the clutch mechanism, showing a modified form of bearing-slot.

Similar numerals of reference denote corresponding parts throughout the several views.

The numeral 18 denotes one end of a driven-shaft to which the hub 7 is secured fixedly by means of a key 19. The sleeve 7 extends to the left beyond the hub 22, and has a collar 54 mounted thereon, both the collar and the sleeve being orificed in alinement just over the key 19, and having a set-screw 55 working therein to secure said parts to each other and to the shaft 18. The hub 7 has the hub 22 of a driving pulley rotatably mounted thereon, said pulley having the rim 23, which is wider on the right-hand side and provided on the inner wall of said right-hand side with a cylindrical bearing surface, against which the semi-cylindrical friction-bodies 1 and 2 are adapted to bear frictionally and removably. The hub 7 projects to the right in spaced relation from the right-hand end of the shaft 18, and is provided in a spaced portion with interior threads into which exteriorly, the threaded end of a cylinder 24 may be removably secured. The outer end of said cylinder 24 has a detachable closure 32 provided with a small transverse orifice 44, through which a lubricant may be injected, thus furnishing a chamber containing lubricant adapted to lubricate the bearings. A channel 56 is located in the sleeve 7 to communicate between the receptacle 24 and the bearings of the device. The hub part 7 has oppositely extending integral arms 10 and 11 provided with the heads 21 and 3, respectively. The ends of the semi-circular bodies 1 and 2, which are adjacent to and spaced from a head 3, are enlarged at 5 and 6, and the numeral 4 denotes a flat piece or rod of spring steel, and which has been cast in said heads 5, 3 and 6, as shown, to furnish resilient hinges for the semi-rigid friction-heads 1 and 2. The outer surfaces of the friction-heads 1 and 2 are made semi-circular to conform themselves exactly to the inner cylindrical part or face of the pulley-rim 23, when thrust into frictional engagement therewith by means to be hereinafter described. The head 21 on the rigid arm 10 is transversely orificed to receive a pintle 20, whose ends extend beyond the said head to provide pivots for the orificed ends 41 of the like bodies 38, which are spaced apart for that purpose, the opening between the parts 41 being then gradually diminished to form converged faces 39 opposite to each other, adapted to seat the oppositely beveled-faces of a nut 16 on the threaded end of a bolt 17, the latter seated movably in a space between the bodies 38. The said bodies 38 have integral projections 12 and 13 on their opposite sides, beveled and adapted to fit the like beveled-faces of the lugs 8 and 9, which are integrally projected from the free ends of the friction-heads 1 and 2.

The numeral 45 denotes a sleeve mounted upon the cylinder 24, and which has on its outer end, a radially extending plate 27, which is flanged over at the circumference to closely approach the right-hand edges of the friction-edge 1 and 2, to serve as a cover. Said part 45 and its face part 27 have an integral annular part 28 projecting to the right concentrically with said shaft 18 about the cylinder 24, and spaced apart therefrom, and having on its inner face an annular groove 29 in which is received an annular flange 30 integral with the inner end of an outwardly flaring hollow hand-wheel or grip 31. The part 31 and the part 28, to which it is rotatably secured, are cast detachably together so that while the part 31 is rotatable freely in the groove 29, it cannot be detached from its seat 28.

The numeral 33 denotes an inwardly extending flattened lug, of which there are two oppositely placed on the inner flaring surface of said hand-wheel 31, the lugs having circular sockets 34 opposite to each other, and adapted to receive the bent over ends of a forked part of a hand-lever, which may be fulcrumed outside of said friction-clutch, if desired, whereby the said hand-wheel may be shifted in or out, said hand-lever and its fulcrum not being shown herein. Such a lever, however, is not absolutely necessary, since the hand-wheel may be actuated merely by grasping it in the hand and pushing it to and fro, as desired, to put the friction-clutch into or out of operation. This operation is performed with safety to the operator, since the hand-wheel 31 does not receive any appreciable rotation when the friction-heads are suddenly engaged with the inner face of the rim of the driving pulley 23.

The sleeve 45 has an integral lug, transversely orificed to receive a pintle 35, on whose ends are pivoted the forked ends of a link 36, the other oppositely extending forked ends of which are pivotally mounted on another pintle 37, seated in the orifices 43 of the bodies 38. The disk-part of the cover 27 is radially slotted from said lug to permit the head of the bolt 17 to pass thereinto, so that the latter may be turned to adjust the position of the nut 16 to take up wear on the friction-heads and keep the said bodies in proper actuating position relative thereto. The opposite part of the disk 27 is grooved at 26 to provide clearance for a pin 25, whose inner end is secured to the head 3, and whose outer end is square, and extends into the groove 26. This pin prevents side strain on the cover-part 27, and on the bodies 36 and 38, due to the action of the device.

Fig. 2 represents the bodies 38 transversely sectioned at 14 and 15 to show the beveled face nut 16 seated between them operatively. Figs. 3 and 4 also illustrate the relations of the bolt 17 and its beveled-nut 16 to said bodies 38.

When the hand-wheel is moved to the right, the bodies 38 are rocked, so that their beveled-projections 13 push outwardly against the bevel lugs 8 and 9 on the friction heads 1 and 2, respectively, thereby throwing these semi-rigid friction-heads into frictional engagement with the inner face of the pulley 23, to cause the latter to impart rotation through said bodies 38 and the arms 10 and 11 to the hub 7 and its connected driven shaft 18. When the hand-wheel 31 is moved to the right it swings back the bodies 38 so that their beveled faces move toward each other, thus permitting the friction-heads to move out of contact with the pulley due to the reaction of the spring-bar 4.

The spring body 4 is strong, yet sufficiently elastic to provide resiliency enough to permit the friction-heads 1 and 2 to be swung readily into frictional engagement with said driving pulley and since said heads are rigid, they effect a perfect engagement with the pulley.

In Figs. 5 and 6, which are on a larger scale than the figures previously described, I have shown a variation in the method of mounting the plunger-bolt 17, intended to prevent centrifugal force from gradually displacing same from its position of acting to spread apart the friction-heads 1 and 2. In this form of the device, the intermediate link 36 is eliminated. The sleeve 24 is furnished with integral projecting radial parts or plates 46 which extend to the flanged part 27, and are each provided with an oblique slot 47 which has at its inner end the circular extension 48 as shown. The bodies 38', which are the parts numbered 38 in Fig. 1, except as slightly modified in form as shown, have alined bearing orifices adapted to receive a pintle 37 whose ends extend slidably into the slots 47. When the sleeve 24 is shifted to the right, by the moving of the hand-wheel 31 in the same direction, the walls of the slots 47 in moving by the pintle 37 gradually move it while rocking its connected bodies 38' toward the sleeve 24 until the pintle is received into the circular extensions 48 of the slots. Since the circular extensions 48 have their outer parts arranged at an angle to the slot, the pintle while therein will be unaffected by the centrifugal force of the device when rotated, and will not become displaced thereby. In this position the parts of the clutch will remain until the wheel 31 is pushed to the left, which will move the pintle 37 to cause the bodies 38' to act upon the bevels 8 and 9 to release the friction-heads 1 and 2.

In Fig. 6, is shown the pair of plates or projections 46 in whose slots 47 the pintle 37 is mounted. The plates have alined orifices to seat the roller bearing-ends of the pintle 37, which ends have transverse openings to receive the split-keys 53.

It will be observed that when the pintle 37 with its anti-friction rollers is seated in the outwardly pocketed inner ends of the oblique slots 47, the pintle is retained in place in the pockets by reason of centrifugal force acting on the levers and movable connections thereof. When the hand-wheel is moved appropriately in an opposite direction to pull the pintle from said pocketed parts of the slots, centrifugal force aids in easing the movement of shifting the friction-heads into engagement with the pulley-rim and in holding them in contact therewith. The lever-bodies 38 having bearing openings 42 at one end of each whereby they are mounted to swing on the pintles on said fixed arm, sufficient space is left on each side of said bodies 38 at said bearing to permit of an adequate amount of adjustment away from each other when acted upon by means of the beveled nut 16 to take up wear.

Having described my invention, what I claim as new, and desire to secure by Letters Patent, is:

1. In combination, a shaft, an annular rim loosely mounted thereon, an arm fixed on said shaft, like rigid friction-heads abutting upon opposite sides of the inner face of the rim and adapted to frictionally contact the same when thrust outwardly, yieldable elastic connections between the outer end of said arm and the adjacent ends of said friction-heads, and means for moving said heads against said rim removably.

2. In combination, a shaft, an annular rim loosely mounted thereon, an arm fixed on said shaft, like rigid friction-heads abutting upon opposite sides of the inner face of the rim and adapted to frictionally bind the same when thrust outwardly, the ends of said friction-heads adjacent to said arm being enlarged, an elastic bar secured across said arm with its ends fixedly secured in the enlarged ends of said friction-heads, and means for moving said heads against said rim, removably.

3. In combination, a shaft, an annular rim loosely mounted thereon, an arm fixed on said shaft, like rigid semi-circular friction-heads abutting upon opposite sides of the inner face of the rim and adapted to frictionally bind the same when thrust outwardly, the end of said arm and the adjacent friction-heads being enlarged and spaced apart, and orificed in line with each other, a yieldable resilient bar seated in said alined orifices fixedly and adapted to have its intermediate uncovered parts act as an elastic hinge for said heads, and means for moving said heads against said rim, removably.

4. In combination, a shaft, an annular rim loosely mounted thereon, an arm fixed on said shaft, like rigid friction-heads adapted to be moved to bind opposite portions of the inner wall of the rim, two of the adjacent ends of said heads being elastically connected to the end of said arm, and means for moving said friction-heads simultaneously into contact with said rim.

5. In combination, a shaft, an annular rim loosely mounted thereon, oppositely-projecting rigid arms secured to said shaft, friction-heads elastically connected to one of said arms and adapted to be moved toward and frictionally bind opposite parts of the inner wall of the rim, beveled blocks pivoted on opposite sides of the end of the other arm and movably contacting the other ends of said friction-heads, and means for swinging said blocks to cause them to force apart said friction-heads to bind the latter frictionally against said rim.

6. In combination, a shaft, an annular rim loosely mounted thereon, oppositely-projecting rigid arms secured to said shaft, semi-circular rigid friction-heads secured at one end of each elastically to one of said arms, like beveled integral bosses on the other ends of said heads, like bodies pivoted on the end of the other arm between and having beveled faces adapted to movably fit the beveled bosses on said heads, and means for swinging said beveled bodies to cause them to slidingly spread the beveled bosses apart to cause the friction-heads to frictionally bind the rim.

7. In combination, a shaft, an annular rim loosely mounted thereon, oppositely-projecting rigid arms fixed to said shaft, like semi-circular rigid friction-heads elastically connected at one end of each to one of said arms, the other ends having beveled end faces, blocks pivoted on the end of the other arm, and having beveled faces fitting the beveled ends of said heads, the opposed inner faces of said blocks being beveled, means for rocking said blocks to push out said friction-heads, and a wedge adjustably fitted between said inner beveled faces.

8. In combination, a shaft, an annular rim loosely mounted thereon, oppositely-projecting rigid arms fixed to said shaft, like semi-circular rigid friction-heads elastically connected at one end of each to one of said arms, the other end having beveled end faces, blocks pivoted on the end of the other arm and having like beveled faces fitting the beveled faces on said friction-heads, means for rocking said blocks to push the friction-heads against the said rim removably, the opposed inner faces of said blocks being beveled, a wedge fitting between said inner beveled faces, and means for adjusting said wedge to push apart said inner beveled faces.

9. In combination, a shaft, an annular rim loosely mounted thereon, friction-heads movably connected to said shaft and movable into frictional contact with the rim, wedge-like bodies mounted to rock between said friction-heads to force them against the rim, a housing fixed about the end of said shaft, a sleeve slidable on said housing, said bodies being slidably connected to said sleeve, and a hand-heel rotatably and non-slidably mounted on said sleeve concentrically.

10. In combination, a shaft, an annular rim loosely mounted thereon, friction-heads movably connected to said shaft and movable into frictional contact with the rim, wedge-shaped bodies fitted between and mounted to rock against said friction-heads, a hollow flaring hand-wheel loosely mounted on the end of said shaft, and having connecting-means for the end of a hand-lever, and movable connections between said hand wheel and said wedge-like bodies adapted to act when the hand-wheel is moved toward the shaft to cause the said bodies to rock to spread said friction-heads into frictional contact with said rim.

11. In combination, a shaft, an annular rim loosely mounted thereon, friction-heads connected to said shaft and movable into frictional contact with the rim, means for pushing the friction-heads apart to cause them to engage said rim, and a hollow orificed casing secured about the end of said shaft concentrically and spaced from the end of the shaft to provide a hollow chamber in communication with the bearings of the shaft, adapted to receive a supply of lubricant, or receive the shaft-end farther into its hollow, and an orificed end cover for the said casing.

12. In combination, a shaft, a friction-rim loosely mounted thereon, friction-heads connected to said shaft movably and adapted to be engaged releasably with said rim, means for moving said friction-heads into engagement with said rim, a sleeve secured about the end of said shaft, a disk-like cover slidably mounted on said sleeve and having an inwardly-extending circular flange projecting toward the friction-heads, means for moving said disk to and fro, operative connections between said disk and said friction-head operating-means, said disk being slotted, and a pin connected fixedly with said shaft and extending into the said slot to permit only relative longitudinal movement of the disk toward or away from the shaft.

13. In combination, a shaft, an annular rim rotatably mounted thereon, an arm fixed to said shaft, oppositely-arranged approximately semi-circular friction-heads, yieldable resilient hinges fixed to adjacent ends of said friction-heads and the end of said arm adapted to yield to allow the friction-heads to be moved into frictional engagement with the rim, and then to resiliently retract themselves therefrom when released, and means for pushing said heads against said rim removably.

14. In combination, a shaft, a friction-rim rotatably mounted thereon, friction-heads connected to said shaft and movable into and out of frictional engagement with the rim, an annular plate movable longitudinally to and from the adjacent end of said shaft and adapted to shift said friction-heads to and from said rim, said plate having an annular groove thereabout, and a hand-wheel having an annular ridge, the latter cast within said annular groove to permit said plate to rotate freely and non-slidably over the ridge, said ridge being irremovably seated in said groove.

15. In combination, a shaft, an annular rim rotatably mounted thereon, oppositely-arranged friction-heads mounted within and adapted to releasably frictionally contact with the inner face of the rim, a sleeve slidably secured on said shaft and having a pair of outwardly-extending plates which have alined oblique slots, their ends nearest the shaft being outcurved away from the axis of the device, a pintle whose ends are longitudinally movable along said slots and into their outcurved ends, and beveled rock-bodies connected at one end of each to said pintle and whose opposite ends are seated between said friction-heads, and means adapted to rock the beveled parts of said bodies against said friction-heads to push them apart and into contact with said rim, when said sleeve is moved appropriately to thrust said pintle in one direction said pintle when seated in said outcurved ends of the slots being prevented from displacement therefrom by the action of centrifugal force.

16. In combination, a shaft, an annular rim loosely mounted thereon, friction-heads, a resilient connection between two adjacent ends of said heads, like spaced bodies interposed between the other ends of said heads and movable simultaneously to push said heads into frictional engagement with said rim, and means seated between the said spaced bodies in contact therewith and adjustable apart to take up wear on the said parts.

Signed at Waterloo, Iowa, this 22nd day of Sept. 1913.

FLOYD E. LASURE.

Witnesses:
W. H. BRUNN,
G. C. KENNEDY.

Copies of this patent may be obtained for five cents each, by addressing the "Commissioner of Patents, Washington, D. C."